Oct. 17, 1933.  L. G. MODLIN  1,930,941
ICE CREAM ATTACHMENT AND MIXER FOR MECHANICAL REFRIGERATORS
Filed June 14, 1932  2 Sheets-Sheet 1

Inventor
Lowell G. Modlin
By Clarence A. O'Brien
Attorney

Oct. 17, 1933.   L. G. MODLIN   1,930,941
ICE CREAM ATTACHMENT AND MIXER FOR MECHANICAL REFRIGERATORS
Filed June 14, 1932   2 Sheets-Sheet 2

Inventor
Lowell G. Modlin

By Clarence A. O'Brien
Attorney

Patented Oct. 17, 1933

1,930,941

UNITED STATES PATENT OFFICE 1,930,941

ICE CREAM ATTACHMENT AND MIXER FOR MECHANICAL REFRIGERATORS

Lowell G. Modlin, Huntington, W. Va.

Application June 14, 1932. Serial No. 617,188

3 Claims. (Cl. 62—116)

This invention relates to an attachment for a mechanical refrigerator, whereby ice cream can be frozen in the refrigerator or material mixed or beaten therein, the general object of the invention being to provide a container which is supported in the refrigerator and containing a beater with means for revolving the beater from the motor of the refrigerator.

Another object of the invention is to provide means for automatically stopping the rotation of the beater when the cream mixes to a certain consistency or when it is frozen to a certain extent.

A further object of the invention is to provide manually operated means for operating clutch means for connecting the motor with the beater, and closing a circuit to the motor and opening a valve for supplying refrigerant to coils surrounding the container, simultaneously.

This invention also consists in certain other features of construction and in combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
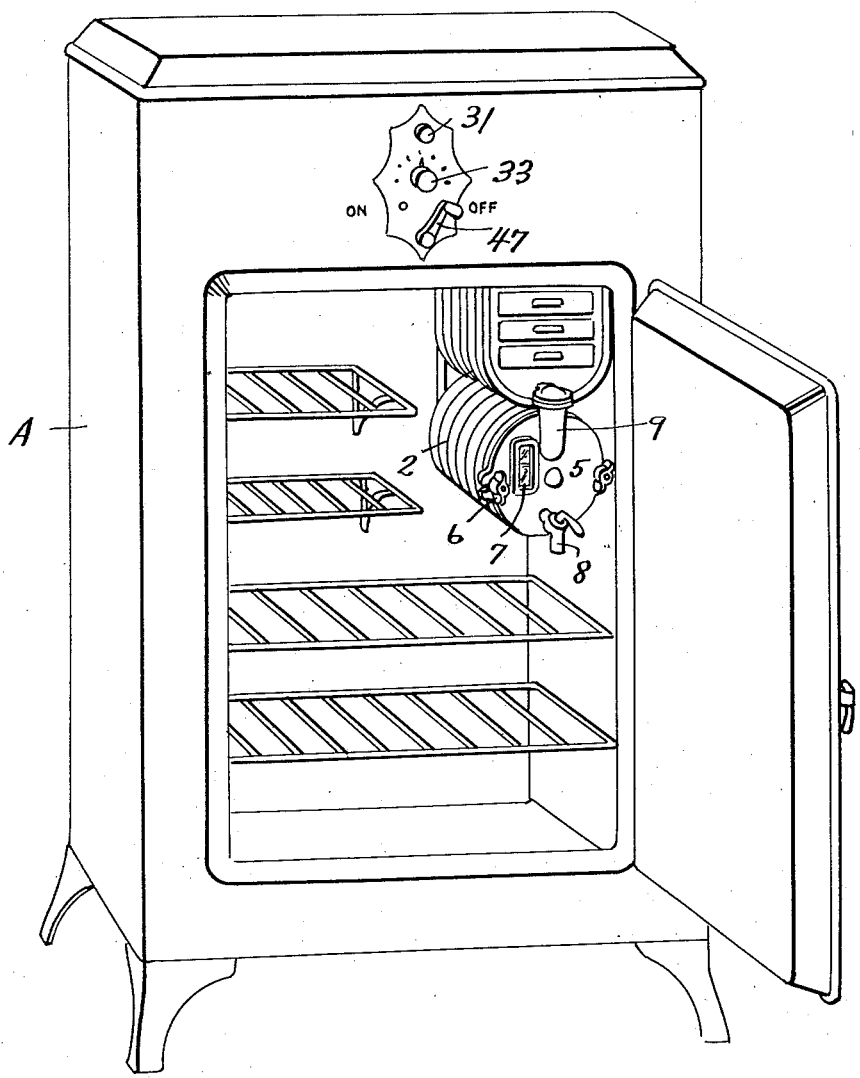
Figure 1 is a view of the refrigerator showing the door open and with the invention applied thereto.

In these drawings the letter A indicates the refrigerator and the numeral 1 indicates a container which is preferably removably supported in the chamber of the refrigerator and which is surrounded by the coils 2 which are connected to the usual refrigerant circulating system 3, a valve 4 controlling the flow of refrigerant from the main part of the system into the coils 2. A cover 5 is provided for the container, and which cover is removably held in place by the clamping means 6 and said cover contains a window 7, a drain cock 8 and a spout 9 the upper end of which is closed by a cap 10. A beater or dasher 11 is removably and rotatably supported in the container by having a bearing part 12 at its end fitting in a bearing 13 formed in the cover with its other end having a reduced non-circular part fitting in a socket in a rotatable member 14 which is rotatably arranged in an opening in the rear end of the container.

The outer end of this member 14 carries a beveled gear 15 for meshing with a gear 16 on the shaft 17 which is provided with a clutch part 18. A sliding clutch part 19 is carried by a shaft 20 which is connected by the gears 21 to a hollow shaft 23. This hollow shaft 23 has a cam disk 24 thereon which is connected by a spring 25 with a forked part 26 of a shaft 27 which is adapted to be connected to the motor M of the refrigerator by the clutch means shown generally at 28. The clutch means are controlled by a rod 29 fastened to the arm 30 of the clutch means and passing through the front of the cabinet and having a knob 31 at its outer end.

The valve 4 is controlled also from the front of the cabinet by a shaft 32 having a knob 33 at its outer end and an arm 34 on its inner end which is connected by a link 35 to an arm 36 of the valve. A bell crank 37 is pivoted to an inner part of the refrigerator, and a link 38 connects the bell crank to an arm 39 pivotally supported on the housing of the valve 4 and adapted to engage with a projection 40 connected with a movable part of the valve, so that when the bell crank is moved rearwardly, the link 38 and arm 39 will move the valve to open position, but when the bell crank 37 is moved forwardly, the arm 39 will simply move away from the projection so that the valve will not be closed.

A spring 41 is connected to a stationary part of the refrigerator and with the upper end of the bell crank and holds this bell crank in either one of its two positions and the lower arm of the bell crank is connected with the sliding clutch part 19 and has its free end connected by the link 42 with the switch arm 43 of the motor switch S.

A link 44 connects the free end of the lower arm of the bell crank with an arm 45 on a rod 46 which passes through the front of the cabinet and is provided with a handle 47. Thus by moving the handle 47 in one direction, the rod 46 will rock so as to cause the link to swing the bell crank on its pivot, thus closing the switch S which furnishes a constant supply of current to the motor M, and moves the sliding clutch part 19 into engagement with the clutch 18 and opens the valve 4. The motor then operates the shaft 17 and through the gears 15 and 16 rotates the beater 11.

Figure 2:
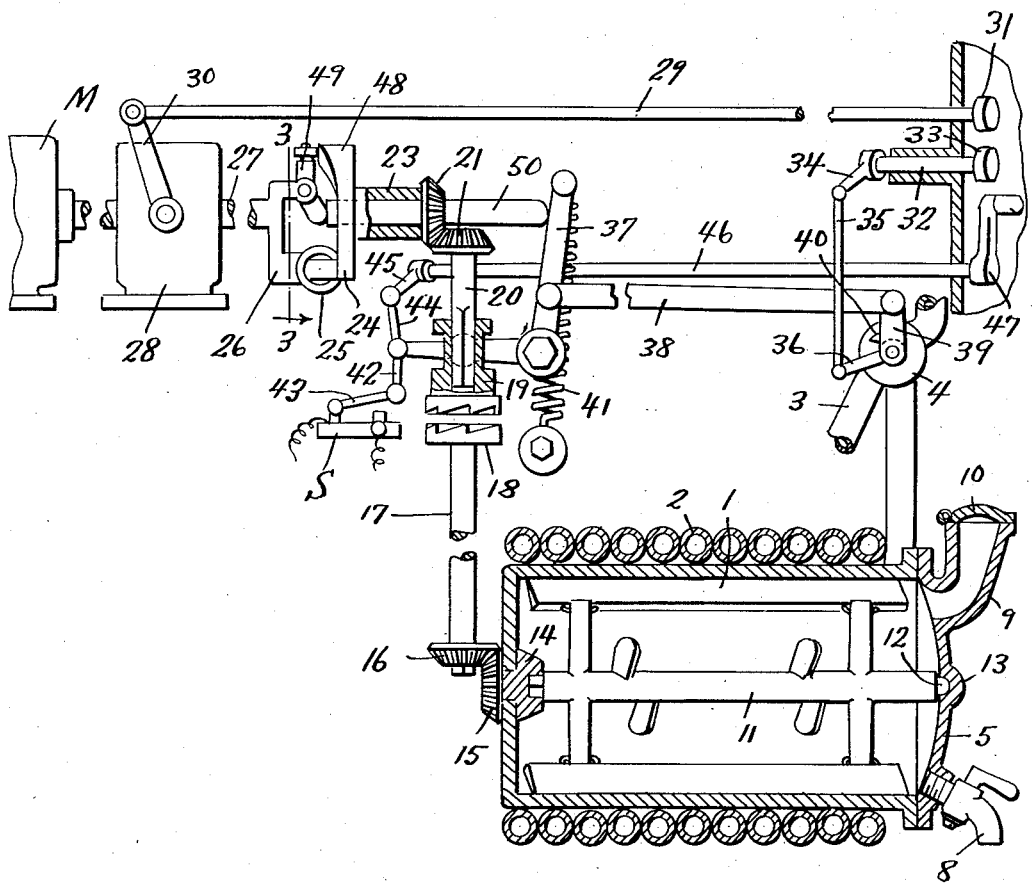
Fig. 2 is a sectional view partly diagrammatic showing the invention.
Figure 3:
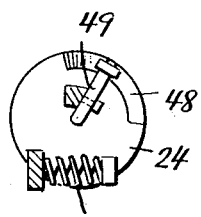
Fig. 3 is a section on line 3—3 of Fig. 2.

When the cream freezes to a certain extent, the spring 25 is compressed and then the cam part 48 of the disk 24 swings the roller carrying arm 49 in a direction to cause the inner end of the arm to engage a rod 50 which is slidably arranged in the hollow shaft 23 so that said rod presses against the upper part of the bell crank 27 and moves the same forwardly to the position it occupies in Fig. 2 and thus the clutch part 19 moves out of engagement with the clutch part 18 so that the rotation of the beater ceases.

The switch is also opened by this movement of the bell crank but the valve remains open so that the refrigerant continues to flow through the coil. Thus the cream continues to be frozen though the beater is not moved.

Any suitable means can be used for removably supporting the container so that it can be readily removed when necessary or desired, and the parts may be arranged so that the beater can be removed after it has stopped rotating.

It will of course be understood that the device can be used for beating cream or other material, and other means besides the coils 2 can be used for subjecting the contents of the container to the cooling action of refrigerant.

By providing the switch S and a circuit to the motor, there is no danger of the motor stopping when the regular circuit thereof is broken by the thermostatic means used with refrigerators of this kind. The valve 4 can be closed whenever desired by means of the hand operated means controlled from the front of the refrigerator.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention what I claim as new is:

1. In combination with a mechanical refrigerator, a container supported therein, a conduit for supplying refrigerant to the exterior part of the container, a valve for controlling the flow of refrigerant to the said conduit, a beater in the container, means driven from the motor of the refrigerator for rotating the beater, such means including a clutch and means automatically operating by the resistance offered to the rotation of the beater by the freezing material in the container for moving the clutch to releasing position, a circuit for the motor, a switch therein, means for opening the switch when the clutch is moved to release position, manually operated means moving the clutch to operative position and for closing the switch, and means for opening the valve when the clutch is moved to operative position.

2. In combination with a mechanical refrigerator, a container located therein, a beater rotatably arranged in the container, means for rotating the beater from the motor of the refrigerator, such means including clutch means, a bell crank pivoted in the refrigerator and having one arm connected to the movable part of the clutch means, a spring for holding the bell crank in either one of its two positions, a circuit for the motor, a switch in the circuit, means for opening the switch when the bell crank is moved to a position to move the clutch means to releasing position, a yieldable means between the parts of the driving connection between the motor and beater, cam means forming a part of said yieldable means, a pivoted arm rocked by the cam means when the yieldable means contract, a member operated by the rocking movement of the arm for moving the bell crank to a position to release the clutch means and open the switch, a coil surrounding the container, means for connecting the coil to the circulating system of the refrigerator, a valve in said connection, manually operated means extending to a point exterior of the refrigerator for moving the parts to a position to cause the bell crank to move the clutch parts into operative position and close the switch, means operated by such movement of the bell crank for opening the valve and means whereby the valve remains open when the bell crank moves to clutch releasing position.

3. In combination with a mechanical refrigerator, a container located therein, a beater rotatably arranged in the container, a sectional shaft geared to the beater, clutch means connecting the two sections of the shaft together, a second sectional shaft geared to the first mentioned shaft and operated from the motor of the refrigerator, a bell crank located in the refrigerator and having a part engaging the movable part of the clutch means, yieldable means connecting the sections of the second mentioned shaft together, means operated by relative movement of one section of the last mentioned shaft with the other section for moving the bell crank to clutch releasing position, a circuit for the motor, a switch for said circuit, and means whereby the switch is closed when the bell crank moves the clutch to operative position and the switch is opened when the bell crank moves to clutch releasing position.

LOWELL G. MODLIN.